United States Patent [19]
Budd et al.

[11] Patent Number: 5,214,719
[45] Date of Patent: May 25, 1993

[54] COMPUTER-BASED SYSTEM AND METHOD FOR CHARACTER RECOGNITION

[75] Inventors: Gerald W. Budd, Farmington; James W. St. Onge; Michael P. Krawec, both of Novi, all of Mich.

[73] Assignee: Phoenix Imaging, Sterling Heights, Mich.

[21] Appl. No.: 317,174

[22] Filed: Feb. 28, 1989

[51] Int. Cl.$^5$ .............................................. G06K 9/62
[52] U.S. Cl. .................................... 382/23; 382/21
[58] Field of Search ............. 382/21, 25, 23, 19, 382/24, 42, 30, 13, 55

[56] References Cited

U.S. PATENT DOCUMENTS

| | | | |
|---|---|---|---|
| 3,160,854 | 12/1964 | Gregory . | |
| 3,873,972 | 3/1975 | Levine . | |
| 3,921,136 | 11/1975 | Bar-Lev . | |
| 3,979,722 | 9/1976 | Sakoe . | |
| 4,020,463 | 4/1977 | Himmel | 382/55 |
| 4,066,998 | 1/1978 | Lidkea . | |
| 4,467,437 | 8/1984 | Tsuruta et al. | 382/30 |
| 4,468,807 | 8/1984 | Moulton | 382/2 |
| 4,504,970 | 3/1985 | Werth et al. | 382/14 |
| 4,525,860 | 6/1985 | Boivie | 382/21 |
| 4,566,124 | 1/1986 | Yamamoto et al. | 382/21 |
| 4,607,386 | 8/1986 | Morita et al. | 382/13 |
| 4,628,532 | 12/1986 | Stone et al. | 382/21 |
| 4,630,309 | 12/1986 | Karow | 382/56 |
| 4,658,428 | 4/1987 | Bedros et al. | 382/30 |
| 4,685,143 | 8/1987 | Choate | 382/25 |
| 4,700,402 | 10/1987 | Okai et al. | 382/21 |
| 4,712,248 | 12/1987 | Hongo | 382/22 |
| 4,742,556 | 5/1988 | Davis, Jr. et al. | 382/51 |
| 4,747,150 | 5/1988 | Knutsson et al. | 382/21 |
| 4,747,675 | 5/1988 | Nagler | 350/410 |
| 4,748,675 | 5/1988 | Suzuki et al. | 382/21 |
| 4,813,078 | 3/1989 | Fujiwara et al. | 382/21 |
| 4,817,172 | 3/1989 | Cho | 382/21 |
| 4,878,248 | 10/1989 | Shyu | 382/9 |
| 4,887,303 | 12/1989 | Hongo | 382/25 |

FOREIGN PATENT DOCUMENTS 53-74842  7/1978  Japan .

OTHER PUBLICATIONS

Clapper "Pattern Recognition System" IBM Technical Disclosure Bulletin, vol. 13, No. 5, Oct. 1970.

*Primary Examiner*—Herbert Goldstein
*Assistant Examiner*—Yon Jung
*Attorney, Agent, or Firm*—Harness, Dickey & Pierce

[57] ABSTRACT

A character recognition system and method is disclosed which provides for the teaching and recognition of characters. The system includes an apparatus and method for obtaining an image which includes the character, and for sampling the character to create a plurality of sample points. A vector correlation is performed on these sample points which compares the stored points to those of known characters. The system also provides a precedence table for determining the correct order of recognition of any correlation of multiple characters.

7 Claims, 29 Drawing Sheets

Fig. 4

62 — MAIN MENU

64 — P - - Part Selection
68 — A - - Analyze
74 — L - - Local Lock
78 — Q - - Quit

Fig. 5

74 — PASSWORD MENU

76 — Enter Password

Fig. 6

62 — MAIN MENU

64 — P - - Part Selection
68 — A - - Analyze
74 — L - - Local Lock
80 — S - - System Parameters 78 — Q - - Quit

Fig. 7

SETUP MENU

82 — F - - Field Creation
88 — O - - Field On/Off
90 — V - - Vision Menu
118 — T - - Teach Characters
170 — C - - String Commands
180 — S - - Software Controls
188 — H - - Hardware Switches
184 — X - - Trigger Switches ESC - Quit

Fig. 8

84 — FIELD FONT

```
         202      200
          |        |
       Field 0:   0
       Field 1:   0 — 204
       Field 2:   0
       Field 3:   0
       Field 4:   0
       Field 5:   0
       Field 6:   0
       Field 7:   0
```

Fig. 9

86 — ISOLATE MENU

Home - - Increment
Enter - - Size/Move

ESC - - Quit

206 — Increment = 10
208 — Status = Move

Fig. 10

FIELD FONT

| | |
|---|---|
| Field 0: | 0 |
| Field 1: | 0 |
| Field 2: | 0 |
| Field 3: | 0 |
| Field 4: | 0 |
| Field 5: | 0 |
| Field 6: | 0 |
| Field 7: | 0 |

HOME -- Toggle increment: 1
ESC    -- Quit

Fig. 11

SETUP MENU

F -- Field Creation
O -- Field On/Off
V -- Vision Menu
T -- Teach Characters
C -- String Commands
S -- Software Controls
H -- Hardware Switches
X -- Trigger Switches ESC - Quit

Fig. 12

FIELD SELECT

```
  214           210
   |             |
0  Off/CR/TM    0
1  Off/CR/TM    0
2  Off/CR/TM    0
3  Off/CR/TM    0 — 212
4  Off/CR/TM    0
5  Off/CR/TM    0
6  Off/CR/TM    0
7  Off/CR/TM    0
```

ESC -- Quit

Fig. 13

SETUP MENU

F - - Field Creation
O - - Field On/Off
V- - Vision Menu
T - - Teach Characters
C - - String Commands
S - - Software Controls
H - - Hardware Switches
X - - Trigger Switches ESC - Quit

Fig. 14

VISION MENU—90

92 — A - - Automatic Vision
94 — M - - Manual Vision
96 — V- - VisionMaker

ESC - Quit

Fig. 15

SETUP MENU—80

F - - Field Creation
O - - Field On/Off
V- - Vision Menu
T - - Teach Characters
C - - String Commands
S - - Software Controls
H - - Hardware Switches
X - - Trigger Switches ESC - Quit

Fig. 16

118 — TEACH MENU

120 — A - - Automatic Teach Character
122 — T - - Manual Teach Character
124 — N - - Name Current Character
126 — M - - Modify Character
128 — D - - Delete Character
130 — E- - Erase All Characters/Lights in a Font
132 — F- - Fiducial Teach
134 — L - - Lights Teach 216
|
Font 0: 218
Font 1:
Font 2:
Font 3:
Font 4:
Font 5:
Font 6:
220— Font 7:

Fig. 17

120 —AUTO TEACH MENU

136 — F1 - - Test Points
138 — F2 - - Change Percent
140 — F3 - - Auto Teach Go
142 — F4 - - Alter Parameters ESC - Quit

Fig. 18

ISOLATE MENU

Home - - Increment
Enter - - Size/Move
ESC - - Quit

222 — INCREMENT = 10
208 — STATUS = Move

Fig. 19

120 —AUTO TEACH MENU

136 — F1 - - Test Points
138 — F2 - - Change Percent
140 — F3 - - Auto Teach Go
142 — F4 - - Alter Parameters ESC - Quit

Fig. 20

CHANGE AUTO — 142

```
228                                         224
 |                                           |
144 — X Space                              6 — 226
146 — Y Space                              6
148 — REDUCE 1                             5
150 — OR / AND                            ON
152 — REDUCE 2                            10
154 — SHOW STEP                           ON 230 — HOME  - - Toggle increment : 1
      ESC   - - Quit
```

Fig. 21

AUTO TEACH MENU

136 — F1 - - Test Points
138 — F2 - - Change Percent
       F3 - - Auto Teach Go
       F4 - - Alter Parameters ESC - Quit

Fig. 22

AUTO TEACH MENU

F1 - - Test Points
F2 - - Change Percent
F3 - - Auto Teach Go
F4 - - Alter Parameters ESC - Quit

ENTER NEW PERCENT: — 232

Fig. 23

TEACH MENU

A - - Automatic Teach Character  
122 — T - - Manual Teach Character  
        N - - Name Current Character  
        M - - Modify Character  
        D - - Delete Character  
        E - - Erase All Characters/Lights in a Font  
        F - - Fiducial Teach  
        L - - Lights Teach Font 0:  
Font 1:  
Font 2:  
Font 3:  
Font 4:  
Font 5:  
Font 6:  
Font 7:

Fig. 24

POINTS MENU

Use Arrow Keys to Move Cursor  
158 — ENTER - - Insert/Remove Points  
160 — F1     - - Toggle Positive and Negative  
162 — F2     - - Test Points  
164 — F3     - - Change Percent  
166 — F4     - - Multiple Images  
168 — HOME - - Change Increment ESC      - - Quit  
234 — INC      = 10  
236 — PERCENT = 60

Fig. 25

TEACH MENU — 118

```
         A - - Automatic Teach Character
         T - - Manual Teach Character
124 —   N - - Name Current Character
         M - - Modify Character
         D - - Delete Character
         E - - Erase All Characters/Lights in a Font
         F - - Fiducial Teach
         L - - Lights Teach
```

Font 0:
Font 1:
Font 2:
Font 3:
Font 4:
Font 5:
Font 6:
Font 7:

Fig. 26

TEACH MENU

```
A - - Automatic Teach Character
T - - Manual Teach Character
N - - Name Current Character
M - - Modify Character
D - - Delete Character
E - - Erase All Characters/Lights in a Font
F - - Fiducial Teach
L - - Lights Teach
```

Font 0:
Font 1:
Font 2:
Font 3:
Font 4:
Font 5:
Font 6:
Font 7:
Enter Character Name: — 238

Fig. 27

TEACH MENU

A - - Automatic Teach Character
T - - Manual Teach Character
N - - Name Current Character
M - - Modify Character
D - - Delete Character
E - - Erase All Characters/Lights in a Font
F - - Fiducial Teach
L - - Lights Teach Font 0:
Font 1:
Font 2:
Font 3:
Font 4:
Font 5:
Font 6:
Font 7:
Enter Font Number : — 240

*Fig. 28*

TEACH MENU

A - - Automatic Teach Character
T - - Manual Teach Character
N - - Name Current Character
M - - Modify Character
D - - Delete Character
E - - Erase All Characters/Lights in a Font
F - - Fiducial Teach
L - - Lights Teach 240    244
 |      |
Font 0:  N — 242
Font 1:
Font 2:
Font 3:
Font 4:
Font 5:
Font 6:
Font 7:

Fig. 29

TEACH MENU

A - - Automatic Teach Character
T - - Manual Teach Character
N - - Name Current Character
M - - Modify Character
D - - Delete Character
E - - Erase All Characters/Lights in a Font
F - - Fiducial Teach
L - - Lights Teach Font 0:   N
Font 1:   N
Font 2:
Font 3:
Font 4:
Font 5:
Font 6:
Font 7:
Enter Character Name :

Fig. 30

TEACH MENU

A - - Automatic Teach Character
T - - Manual Teach Character
N - - Name Current Character
M - - Modify Character
D - - Delete Character
E - - Erase All Characters/Lights in a Font
F - - Fiducial Teach
L - - Lights Teach Font 0:   N
Font 1:   N
Font 2:
Font 3:
Font 4:
Font 5:
Font 6:
Font 7:
Enter Font Name :

Fig. 31

MODIFY MENU

Use Arrow Keys to Move Points
Over Highlighted Character.
Hit ESC When Finished.
Home - - Toggle Increment.

INC     =  10
PERCENT =  90
NEGATIVE

Fig. 32

TEACH MENU

A - - Automatic Teach Character
T - - Manual Teach Character
N - - Name Current Character
M - - Modify Character
128 —  D - - Delete Character
E - - Erase All Characters/Lights in a Font
F - - Fiducial Teach
L - - Lights Teach

```
          252      246
           |        |
        Font 0:   NT — 248
254 — Font 1:    N — 250
        Font 2:
        Font 3:
        Font 4:
        Font 5:
        Font 6:
        Font 7:
```

Enter Font Number : 0
The Character N in font 0 Already Exists.
Do You Wish to Overwrite (Y/N) ?

Fig. 33

TEACH MENU

A - - Automatic Teach Character
T - - Manual Teach Character
N - - Name Current Character
M - - Modify Character
D - - Delete Character
E - - Erase All Characters/Lights in a Font
F - - Fiducial Teach
L - - Lights Teach Font 0:   NT
Font 1:   N
Font 2:
Font 3:
Font 4:
Font 5:
Font 6:
Font 7:
Enter Character Name : — 256

Fig. 34

TEACH MENU

A - - Automatic Teach Character
T - - Manual Teach Character
N - - Name Current Character
M - - Modify Character
D - - Delete Character
E - - Erase All Characters/Lights in a Font
F - - Fiducial Teach
L - - Lights Teach Font 0:   NT
Font 1:   N
Font 2:
Font 3:
Font 4:
Font 5:
Font 6:
Font 7:
Enter Font Numbers : 1 — 258

Fig. 35

TEACH MENU

A - - Automatic Teach Character
T - - Manual Teach Character
N - - Name Current Character
M - - Modify Character
D - - Delete Character
E - - Erase All Characters/Lights in a Font
F - - Fiducial Teach
L - - Lights Teach

```
252    246 248
 |      \ /
Font 0:  NT
Font 1:
Font 2:
Font 3:
Font 4:
Font 5:
Font 6:
Font 7:
```

Fig. 36

TEACH MENU

A - - Automatic Teach Character
T - - Manual Teach Character
N - - Name Current Character
M - - Modify Character
D - - Delete Character
E - - Erase All Characters/Lights in a Font
F - - Fiducial Teach
L - - Lights Teach

```
252
 |
Font 0:  NT
Font 1:
Font 2:
Font 3:
Font 4:
Font 5:
Font 6:
Font 7:
Enter Font Numbers : —260
```

Fig. 37

TEACH MENU

A - - Automatic Teach Character
T - - Manual Teach Character
N - - Name Current Character
M - - Modify Character
D - - Delete Character
E - - Erase All Characters/Lights in a Font
132 — F - - Fiducial Teach
134 — L - - Lights Teach 252
|
Font 0:
Font 1:
Font 2:
Font 3:
Font 4:
Font 5:
Font 6:
Font 7:

Fig. 38

SETUP MENU

F - - Field Creation
O - - Field On/Off
V - - Vision Menu
T - - Teach Characters
170 — C - - String Commands
S - - Software Controls
H - - Hardware Switches
X - - Trigger Switches ESC - Quit

Fig. 39

STRING MENU

172 — P  -  Precedence Table
174 — A  -  Average Distance
176 — D  -  Define Verification Strings
178 — V  -  Verification Strings On/Off ESC - Quit

Fig. 40

PRECEDENCE MENU

ESC - Quit 272              262

Precedence String [0] {                 }
Precedence String [1] {                 }
Precedence String [2] {                 }
Precedence String [3] {                 }
Precedence String [4] {                 }
Precedence String [5] {                 }
Precedence String [6] {                 }
Precedence String [7] {                 }

1 - 8965430271 — 264
A - BMNQSZGWXEDRPOUVHKFYCJTLI — 266
X - alphanumeric — 268

Which Strings? — 270

Fig. 41

PRECEDENCE MENU

ESC - Quit

Precedence String [0] { }
Precedence String [1] { }
Precedence String [2] { }
Precedence String [3] { }
Precedence String [4] { }
Precedence String [5] { }
Precedence String [6] { }
Precedence String [7] { }

1 - 8965430271
A - BMNQSZGWXEDRPOUVHKFYCJTL
X - alphanumeric

Type string number: —272

Fig. 42

170 — STRING MENU

172 — P - Precedence Table
174 — A - Average Distance
176 — D - Define Verification Strings
178 — V - Verification Strings On/Off ESC - Quit

Fig. 43

VERIFY STRING ON/OFF

|   | 274 | 276 |
|---|---|---|
|   | 0 On/OFF | OFF |
|   | 1 On/OFF | OFF |
|   | 2 On/OFF | OFF |
| 278 — | 3 On/OFF | OFF — 280 |
|   | 4 On/OFF | OFF |
|   | 5 On/OFF | OFF |
|   | 6 On/OFF | OFF |
|   | 7 On/OFF | OFF |

ESC - Quit

Fig. 44

AVERAGE DISTANCE

|   | 282 | 286 |
|---|---|---|
|   | Font 0: | 20 |
|   | Font 1: | 20 |
|   | Font 2: | 20 |
|   | Font 3: | 20 |
| 284 — | Font 4: | 20 — 288 |
|   | Font 5: | 20 |
|   | Font 6: | 20 |
|   | Font 7: | 20 |

ENTER - To Modify Value
HOME  - Toggle Increment : 1
ESC   - Quit

Fig. 45

MAIN MENU

68 —
- P - - Part Selection
- A - - Analyze
- L - - Local Lock
- S - - System Parameters Q - - Quit

Fig. 46

ANALYZE MENU

192 — F1    - - Change Display Options
164 — F2    - - Zero's Count and Shift Register ESC    - - Quit

196 — OUTPUT FLAGS

|  |  | 302 |
| --- | --- | --- |
| 290 — | Screen | ON |
| 292 — | Host | OFF |
| 294 — | One Touch | OFF |
| 296 — | Continuous | OFF |
| 298 — | Live Image | OFF |
| 300 — | DIO | OFF |

HOME - Toggle Increment : 1
ESC  - Quit

Fig. 48

ANALYZE MENU

F1      --Change Display Options  
F2      --Zero's Count and Shift Register

ESC      --Quit

[0] {n                       }

```
                  252  304
                    \  /
GOOD:  [0]170  [1] 0  [2] 0  [3] 0  [4] 0  [5] 0  [6] 0  [7] 0
TOTAL: [0]169  [1] 0  [2] 0  [3] 0  [4] 0  [5] 0  [6] 0  [7] 0
```

Fig. 49

FILE MENU

66 — R    --   Retrieve  
67 — S    --   Save  
70 — D    --   File Directory  
72 — X    --   Delete File ESC    --   Quit

Fig. 50

FILE MENU

R    --   Retrieve  
S    --   Save  
D    --   File Directory  
X    --   Delete File  
ESC    --   Quit

TYPE FILE NAME: — 306

Fig. 51 rw- 1 152924/152924 - crrawnv — 308
rw- 1 510/510 - test1 — 310

Hit any key to continue - - -

Fig. 52

FILE MENU

R -- Retrieve
S -- Save
D -- File Directory
X -- Delete File

ESC -- Quit

TYPE FILE NAME: test 2 — 312

Fig. 53

FILE MENU

R -- Retrieve
S -- Save
D -- File Directory
X -- Delete File

ESC -- Quit

TYPE FILE NAME: test 1
PLEASE WAIT. CREATING BLOCKS . . . — 314

SETUP MENU

```
        F - - Field Creation
        O - - Field On/Off
        V - - Vision Menu
        T - - Teach Characters
        C - - String Commands
180 —   S - - Software Controls
188 —   H - - Hardware Switches
184 —   X - - Trigger Switches
```

ESC - Quit

Fig. 55

182 — SOFTWARE FLAGS

| 326 | 328 |
|---|---|
| 316 — Context | ON |
| 318 — Correlate | OFF |
| 320 — Full String | ON |
| 322 — Locate | OFF |
| 324 — VM/MN. | 1 |

HOME - Toggle Increment : 1
ESC   - Quit

Fig. 56

190 — HARDWARE FLAGS

```
                  342              344
                   |                |
330 — Num. Cameras                  1
332 — Field Select                  0
334 — Input Delay                   0
336 — Strobe/ESHUT/RS-170           2 — 346
338 — Shift Register                0
340 — Number of PPP                 3
```

HOME - Toggle Increment : 1
ESC  - Quit

Fig. 57

186 — TRIGGER FLAGS

```
                360         364
                 |           |
350 — LOCAL                  ON
352 — RISING                 OFF — 362
354 — FALLING                OFF
356 — HOST                   OFF
358 — CONTINUOUS             ON
```

HOME - Toggle Increment : 1
ESC  - Quit

COMPUTER-BASED SYSTEM AND METHOD FOR CHARACTER RECOGNITION

BACKGROUND OF THE INVENTION

1. Field of the Invention

The present invention generally relates to a method and apparatus associated with a character recognition system.

2. Discussion

Character recognition systems are used within a wide variety of industrial and commercial applications. These systems allow a plurality of characters to be recognized in order to effectively do such things as: identify and analyze manufacturing faults, identify types of goods for processing, or a plurality of other similar types of activities.

These character recognition systems are normally embodied within a given computerized vision system as a feature thereof. If an individual user, having a computerized vision system, wishes to add a character recognition system to the vision system, he normally would need a specifically tailored recognition system. If the vendor providing the vision system had no recognition system, the individual user would be forced to purchase an entirely new vision and recognition system.

Additionally, these character recognition systems required the use of a highly complex set of operations which are usually written in a highly complex programming language. The complexity associated with the creation of such a complex set of character recognition operations has been a great impediment to the development of the use of such character recognition systems in many areas. In particular, this complexity has been due to the complex nature associated with the presentation of these vision operations to a user and to the highly complex nature of the entire teaching process. Additionally, many of these systems don't allow a user to manually teach characters resulting in a decrease in the utility or effectiveness of the system. For all of these above-mentioned reasons, it is greatly believed that growth in such character recognition systems has been stunted and great improvements may be made in these areas.

SUMMARY OF THE INVENTION

A selected embodiment of the present invention allows for a character recognition system to be placed into and used within a wide range of computerized vision system. This system allows a user to develop a set of operations in a substantially easier manner than has been done before. This is done by grouping a plurality of character recognition operations into a plurality of categories arranged in a general tree-like structure. This structure is presented to a user in a menu-like fashion and allows for the automatic teaching, in addition to manual teaching, of characters. Additionally, this invention allows for the automatic highlighting of characters and for the teaching and recognition of fiducials and light patterns. Also disclosed is a data packaging technique associated with the compilation and processing of correlation data.

These and other aspects, features, advantages, and objects of this invention will be more readily understood upon reviewing carefully the following detailed description in conjunction with the accompanying drawings and appended claims.

BRIEF DESCRIPTION OF THE DRAWINGS

For a more complete understanding of the present invention relative to the advantages thereof, reference is now made to the following description taken in conjunction with the accompanying drawings. In describing the overall invention, reference will be made to the accompanying drawings wherein like numerals in the various figures refer to the same or similar elements or features and in which:

FIGS. 4-57 are general illustrations relations to the user displays associated with the preferred embodiment of this invention;

DETAILED DESCRIPTION OF THE INVENTION

Figure 1:
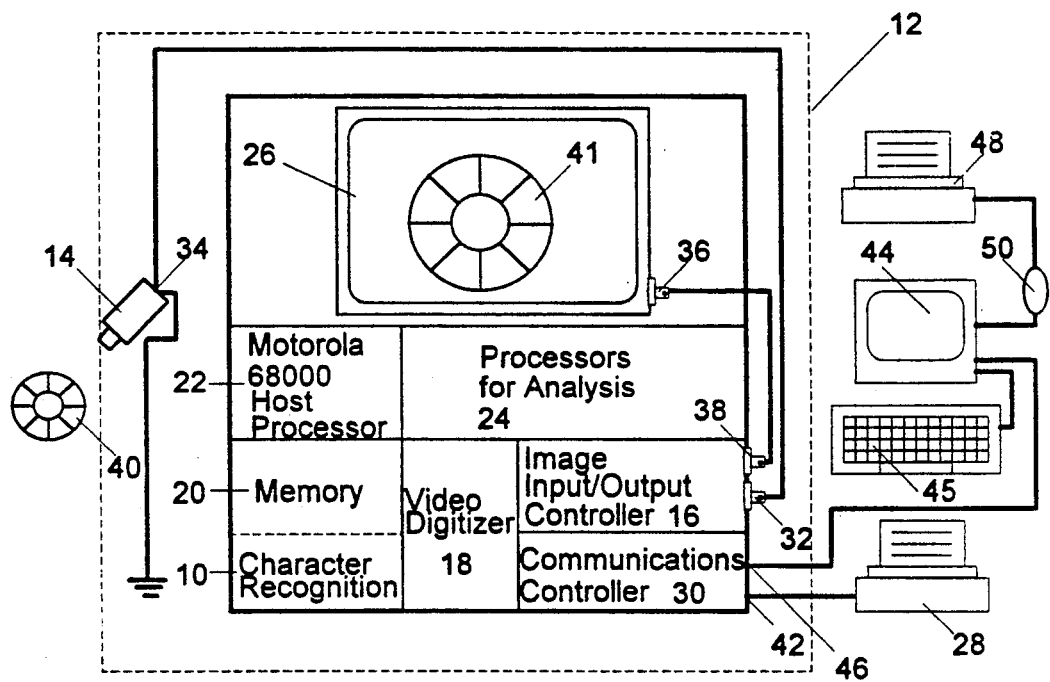
FIG. 1 is a general block diagram illustrating the preferred embodiment of this invention.

Referring now to FIG. 1 there is illustrated a block diagram showing the relationship of the Character Recognition system 10, of the present invention, to a computerized vision system 12. The computerized vision system 12 may be arbitrarily selected for the purpose of the present invention as Character Recognition system 10 may be used within a plurality of computerized vision systems. Specifically, for purposes of this discussion, computerized vision system 12 is an AIS-5000 parallel processor system developed by Applied Intelligent Systems, Inc., located at 110 Parkland Plaza, Ann Arbor, Mich. 48103. Vision system 12 contains an industry standard RS-0170 type camera 14, image controller 16, video digitizer 18, memory 20, Motorola 68000 type host processor 22, image analysis processors 24, monitor 26, printer 28, and communications controller 30.

The Motorola 68000 host processor 22 generally operates and controls vision system 12. Image controller 16 allows camera 14 and monitor 26 to communicate with system 12. Specifically, camera 14 and monitor 26 may be coupled to controller 16 through the use of industry standard BNC type connectors 32, 38. Image controller 16 allows an analog type of image 41 related to object 40 to be received from camera 14. This image 41 is then digitized into a byte plane representation by digitizer 18 and stored in memory 20 for processing by processor 24.

The byte plane representation of object 40 represents each pixel of the image 41 by eight bits of information related to the light intensity associated with that particular pixel. Such a byte plane representation is often called a "Gray Scale Image." Processors 24 operate upon this byte plane representation in accordance with a selected set of operations which are inherent within system 12. The result of such operations may be viewed upon monitor 26. Memory 20 also serves, among other things, to store the resultant modified byte plane representation in the character recognition system 10.

Communications controller 30 provides for the coupling of printer 20 to vision system 12 through serial port 42. Additionally, an IBM-type of personal computer for other type of a synchronous terminal device 44 may be used to display selected parameters and analysis results associated with vision system 12.

Vision system 12 allows a user to analyze a given object 40 by performing a number of operations upon the image 41 of item 40 contained upon monitor 26. Since there are an infinite number of analysis objectives needed by user of system 12, no attempt was made in the various computerized vision systems to develop a discrete set of analysis tools or a set of operations that might serve all, or a great deal of all user analysis needs. Rather, a plurality of image operations were developed. These operations are such that each of them acts upon the image 41 of object 40 in a different manner. By developing or creating a given sequence of operations, an image 41 may be effectively analyzed. These operations are normally described and used in terms of some type of standard, and highly complex, programming language. Examples of operations associated with vision system 12 and the associated programming language description are as follows:

| OPERATION | | PROGRAMMING LANGUAGE EQUIVALENT |
|---|---|---|
| (1) | Dilate image in all Directions | #include <aistype.h> d__all (s,syshift, d, dxshift) frame s, d; int syshift, dxshift; |
| (2) | Dilate image to the East and West | #include <aistypes.h> d__ew (s, syshift, d, dxshift) frame s, d; int syshift, dxshift; |
| (3) | Erode image from the East | #include <aistypes.h> e__e frame, d; (s, syshift, d, dxshift) int syshift, dxshift; |

As an operational development example, if one wished to analyze item 40 for structural faults, one may develop a sequence of operations containing only the "dilate in all directions" operation. Such an operation, used a plurality of times, would cause an expansion of the image 41 thereby allowing a user to view fine details associated with the structure of object 40 and thereby allowing for better analysis of the structural integrity therewith. It should be appreciated that as the complexity of the analysis objectives increases, the resultant breadth of the sequence of required operations must accordingly increase as well. Character recognition system 10 utilizes the operations of computerized vision system 12 to obtain and highlight image 41, also but adds a plurality of character recognition operations which allow specific characters contained within image 41 to be taught and later recognized during system 10 operation.

Character Recognition system 10 resides in memory section 20 of system 12 and serves to directly control the operation of system 12 through host processor 22. Character Recognition system 10 may be viewed as an application of system 12 and is itself written in the industry standard "C" programming language. Character Recognition system 10 allows one to select and "teach" a plurality of characters to computerized vision system 12 such that an image may later be analyzed and characters within that image identified during system 10 operation. The teaching, analysis, and other operational features of system 10 are accomplished through a plurality of operational commands which are displayed to a user of system 10 primarily through terminal 44.

Specifically, these operational commands are structured in a general tree-like fashion wherein the structural tree is presented to a system 10 user through a plurality of interactive menus. Within this general tree-like structure resides a plurality of categories in which the operational commands are grouped. A user of system 10 interacts with this structure, thereby defining and selecting an operational command by use of keyboard 45.

Figure 2:
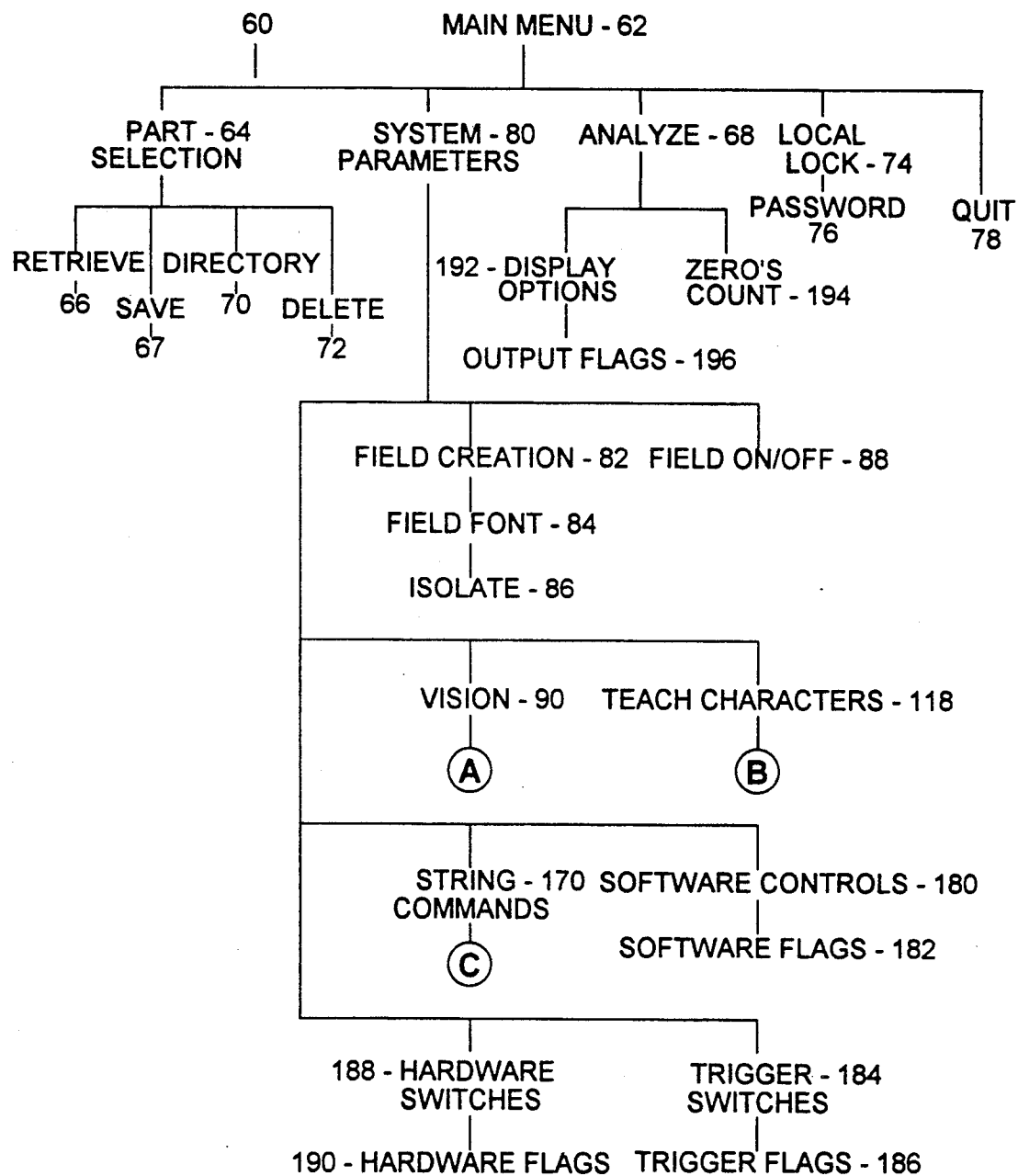
FIGS. 2 and 3 are general illustrations of the categories in which character recognition operations associated with the preferred embodiment of this invention are placed and particularly are illustrations of the general tree-like structure associated with these categories.
Figure 3:
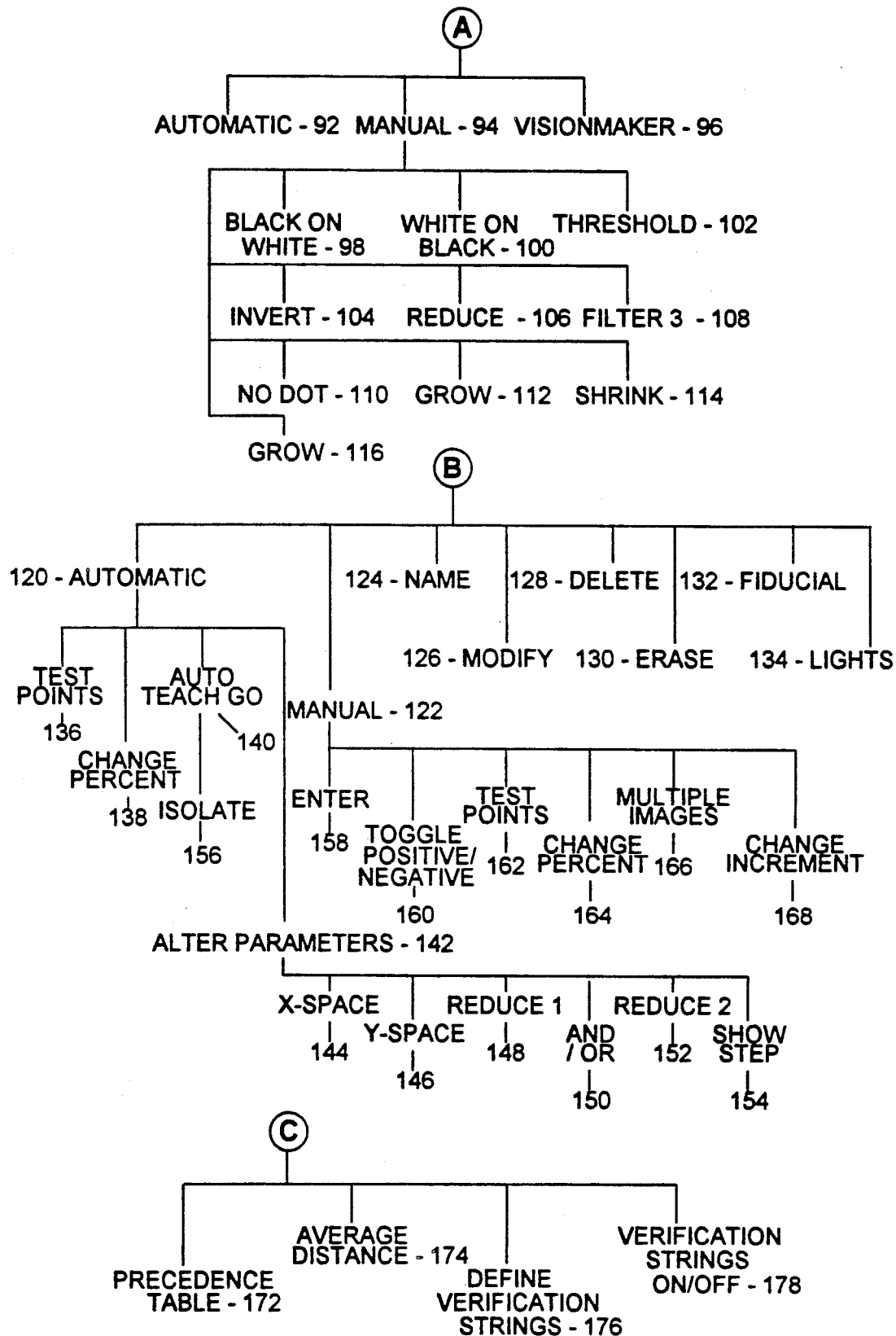

The plurality of categories used to place these operations in illustrated within FIGS. 2 and 3. General tree-like structure 60 may be traversed in a generally vertical categorical manner by a user of system 10 through keyboard 45. The most general category is that of main menu 62 and is simply used to designate an initial starting point for a user of system 10 to traverse structure 60. Normally main-menu 62, part selection 64, analyze 68, local lock 74 and quit 78 are initially displayed to a system 10 user.

Part selection 64 designates a group of operations directed toward a file system of character recognition system 10. In particular, this file system may contain all of the image operations necessary for the teaching and recognition of a plurality of characters. These files are each accessed by a unique character name. Retrieve category 66 is used to place operations which allow a user of system 10 to retrieve a file. Save category 67 is used to place operations which allow a user of system 10 to save a file. Directory category 70 is used to place operations which allow a system 10 user to view a list containing all of the unique files contained within system 10. Delete category 72 contains operations which allow a user of system 10 to delete files.

Local lock category 74 contains operations which generally restrict access to system 10 to those possessing a valid identification code. Specifically, password category 76 allows a user of system 10 to input this unique identification code in order to gain access thereto. Quit category 78 allows a user to exit from system 10.

System parameter category 80 contains all operations necessary for image acquisition; field creation; character teaching; and miscellaneous system 10 features. Specifically, field creation category 82; field font category 84; and isolate category 86 allow a system 10 user to create a field over an acquired image; to associate a specific font with this newly crated field; and to place this field in a particular position upon the image respectively. Field on/off category 88 contains operations which allows a user of system 10 to selectively activate the crated field described above.

Vision category 90 generally contains operations necessary for the development of a bit plane image containing the characters to be taught or analyzed to or by system 10. Category 90 also contains vision operations used to highlight the characters to be taught or analyzed. Specifically, vision category 90 is seen to contain automatic category 92; manual category 94; and VisionMaker category 96.

Such character highlighting is necessary for effective character teaching and recognition which is done by character recognition operations. Specifically, the acquired image is a byte plane representation. In the preferred embodiment of this invention, this byte plane representation must be transformed to that of a bit plane representation. This bit plane representation contains a plurality of pixels each of which are described by a single data bit. A pixel may be considered "activated" when its data bit is logically high or substantially equal to a logical one. The process of highlighting the characters to be taught and analyzed simply involves activating substantially all of the pixels contained within the characters and de-activating, or forcing to a logical 0, the pixels of the rest of the image.

Automatic category 92 contains operations which automatically perform the necessary highlighting of the chosen characters. This highlighting process is substantially hidden from a user of system 10. This process involves the creation of a histogram of the image 41. Such a histogram contains the number of pixels associated with each of the possible brightness values. Since the image 41 is a Gray scale image, the number of possible unique brightness values associated with a given pixel will be approximately 255. Additionally, it is also known that the given characters will generally either be substantially light or darker than the rest of image 41. Thusly, the histogram will show a plurality of pixels occurring at a brightness level either substantially higher or lower than that associated with the great majority of pixels (i.e., the rest of image 41). Thusly, the character pixels have been identified. A bit plane representation may now be made with the corresponding character pixels activated.

VisionMaker category 96 contains a plurality of operations which allow a system 10 user to utilize the VisionMaker System of the Phoenix Imaging Company located at 44440 Phoenix Drive, Sterling Heights, Mich. 48078-7266.

Manual category 94 contains a plurality of operations which allows a system 10 user to perform a sequence of VisionMaker Operations by properly selecting a given category 98-116. Specifically, categories 98-116 allow a system 10 user to specify an overall image 41 processing requirement, such as the desire to highlight characters contained within image 41, without the need to know even the necessary object oriented operations associated with the VisionMaker System.

Selection of white on black category 100 should be made if the characters within image 41 are of a higher brightness than the rest of the image 41. A selection of category 100 causes the following sequence of VisionMaker Operations to affect image 41:

(a) tfr 8 (a,o,b,o)
(b) min_nsew (b,o,b,o)
(c) max_nsew (b,o,b,o)
(d) sub (b,o,a,o,b,o)
(e) abs (b,o,b,o)

The aforementioned max and in operations may be caused to happen a plurality of specified times.

Selection of black on white category 98 should be made if the characters within image 41 of are lower brightness than the rest of image 41. A selection of category 98 causes the following sequence of VisionMaker Operations to affect image 41:

(a) tfr8 (a,o,b,o)
(b) max_nsew (b,o,b,o)
(c) min_nsew (b,o,b,o)
(d) sub (a,o,b,o,b,o)
(d) abs (b,o,b,o)
(e) abs (b,o,b,o)

The aforementioned max and min operations may be caused to happen a plurality of specified times.

Selection of threshold category 102 causes the following Vision Maker Operation to affect image 41, a plurality of specified times:

g & k (b, o, number of specified times, x, o)

Selection of invert category 104 causes the following VisionMaker Operation to affect image 41:

not (x, o, x, o)

The selection of reduce category 106 causes the following VisionMaker Operation to affect image 41, a plurality of specified times:

reduces (x, o, x, o)

The selection of filter 3 category 108 causes the following VisionMaker Operation to affect image 41, a plurality of specified times:

lineof3 (x,o,x,o)

The selection of nodot category 110 causes the following VisionMaker Operation to affect image 41, a plurality of specified times:

nodot (x,o,x,o)

The selection of grow category 112 causes the following VisionMaker Operations to affect image 41, a plurality of specified times:

d _nsew (x,o,x,o)

The selection of shrink category 114 causes the following VisionMaker Operation to affect image 41, a plurality of specified times:

e _nsew (x,o,x,o)

The selection of grow category 116 causes substantially the same effect upon image 41 as did the selection of grow category 112. Grow category 112 is substantially duplicated by grow category 116 because categories 98-116 operate in a sequential order. That is, lower reference numbered categories generally act upon image 41 before higher reference numbered categories, assuming both are selected by a user of system 10. For example, category 102 always acts upon image 41 just before category 104, assuming both are selected. This sequential order makes it additionally easier for a system 10 user to successfully highlight characters of interest. However, since a grow operation 112, 116 generally may be needed before and/or after a shrink operation 114, two grow categories 112 and 116 are needed.

Teach characters category 118 is generally concerned and contains operations necessary to teach a character to system 10 for later recognition. Category 118 is seen to contain the following categories: automatic 120; manual 122; name 124: modify 126: delete 128; erase 130; fiducial 132; and light 134.

Automatic category 120 contains operations associated with the method of allowing a character to be automatically taught to system 10. Automatic teaching, in general, results in a character being sampled at a plurality of points specified by system 10. Contained with category 120 are the following categories: test points 136; change percent 138; auto teach go 140; and alter parameters 142.

Specifically, automatic testing, in the preferred embodiment of this invention, generally requires the placement of a grid over a character to be taught. The intersection of the grid with the character generally describes the test points which are used to describe the character. Category 142 is generally concerned with operations which relate to this grid process. Category 142 shown as containing the following categories; x-space 144; y-space 146; reduce-1 148; or/and 150; reduce 2 152; and show step 154.

X-space 144 and y-space 146 relate to the width (horizontal spacing) and height (vertical spacing) respectively of the aforementioned grid. Values of the width and height are in terms of a "number of pixels." Reduce 1 category 148 contains a parameter for the operations which reduce the width of the character to be taught to a single pixel. Or/and category 150 contains a parameter for the operations relation to the creation of test or sample points created by the intersection of the grid with the character. Reduce 2 category 152 contains a parameter for the operations which reduce the created sample points to a width of a single pixel. Show step category 154 contains operations which allow the results of the intermediate operations contained within the aforementioned categories to be revealed, upon monitor 26, relative to their effect upon image 41.

Auto teach go category 140 contains isolate category 156. Categories 140, 156 relate to and contain operations which allow a grid to initially be created by a user of system 10.

Test points category 136 contains operations which visually identify the characters whose shape can be defined by the test points obtained by the aforementioned character-grid intersection. Change percent category 138 contains operations which allows a user of system 10 to specify the percentage of the aforementioned test points necessary with which to identify the character by. The character is identified by using the points selected with a with a known test vector correlation technique.

Manual category 122 is seen as containing the following categories: enter 158; toggle positive/negative 160; test points 162; change percent 164; multiple images 166; and change increment 168.

Generally, the technique of manual teach allows a user of system 10 to manually specify a set of sampling points contained within the character to be taught. Specifically, enter category 158 contains operations which allow these points to be specified. Toggle positive/negative category 160 contains operations which allow a user of system 10 to specify pixel locations which are to be activated (logical 1) or deactivated (logical 0) in the set of test points. This specification is necessary in general pattern recognition operations where only the highlighting associated with pixels, in a particular location, is necessary. Test points category 162 contains operations which allow characters whose shapes can be described by the aforementioned specified test points to be viewed. Change percent category 164 contains a parameter for the operations allowing a user of system 10 to specify a percentage of the aforementioned test points necessary to identify the character. Multiple images category 166 contains operations allowing system 10 to create multiple images of object 40 and thereafter logically "ANDING" their bit plane equivalents. The preferred embodiment of this invention allows for up to 50 images to be acquired in this manner. This technique is used to locate high-repeatability pixel regions of image 41 thereby enhancing the images. Category 168 contains operations which allow a user of system 10 to specify various increments associated with the operations in Categories 158-166.

Name category 124 contains operations which allow a user of system 10 to define a character by an arbitrarily selected alphanumeric symbol and associate a font or a set of fonts with it. Modify category 126 contains operations which allow any previously defined test points associated with a character to be modified. Delete category 128 contains operations which allow a character and associated data to be deleted from system 10. Erase category 130 contains operations which allow all characters or previously specified positive or negative pixels to be erased within a given font.

Fiducial category 132 contains operations which allow for the teaching of a fiducial to system 10. A fiducial is defined as a character which may appear only once within image 41, but may appear anywhere in the image. A fiducial is used in order to locate regions of an image in which characters are expected to be found and is taught in a manner which was previously specified for teaching characters.

Light category 134 contains operations which allow the manual teaching of pixel activation/deactivation in a manner substantially defined by category 160.

String command category 170 generally contains operations which are concerned with the presentation of the recognized characters to a system 10 user. Contained within category 170 are the following categories: precedence table 172; average distance 174; define verification strings 176; and verification strings on/off 178.

Precedence Table 172 contains operations which allow a system 10 user to define a generally hierarchial alphanumeric string which is used by system 10 to decide which of several possible characters it is recognizing when such a decision needs to be made.

Average distance 174 contains operations which allow a system 10 user to specify an average distance between characters to be recognized. These average distance values are used by system 10 to insert a proper number of blank spaces between recognized characters and to recognize when the precedence table must be checked.

Define verification string category 176 contains operations which allow a system 10 user to define a string of characters which, if recognized in a given order, should cause a simple positive indication to be given by system 10 when the character string in the image matches the verification string. Verification strings on/off 178 contains operations which allow a system 10 user to selectively activate previously defined strings.

Software control category 180 contains software flags category 182. Category 182 contains operations allowing a user of system 10 to ignore previously defined precedence tables or average distance values; to specify whether the correlation procedure used by system 10 should use all of the specified sample points or only the percentage previously specified by the user; to specify whether or not a string corresponding to the previously defined verification string may be a subset of a larger string and still result in a "positive" indication; to specify whether a previously defined fiducial should be located; and to specify the visions technique employed by the user of system 10.

Trigger switches category 184 contains trigger flags category 186 which contains operations allowing a user of system 10 to generally specify how system 10 should apply the set of character recognition operations image 41.

Hardware switches category 188 contains hardware flags category 190. Category 190 contains operations allowing a user of system 10 to specify various features of characteristics associated with Camera 14.

Analyze category 68 contains operations which are generally concerned with the recognition of previously taught characters. Category 68 contains Display Options category 192 which contains Output Flags category 196. Category 68 also contains Zero's Count category 194.

Display options category 192 is generally concerned with the display of analyzed character results to a system 10 user. Category 196 contains operations allowing the user of system 10 to print the results of the character read to terminal 44; to send read results to a host computer from a serial port (not shown); to specify that the current total of good readings is continuously placed upon terminal 44 or available upon an engagement of keyboard 45; to specify that color should be taken from monitor 26; and to specify that an electrical signal should be sent to a computer based external control device upon a recognition. Category 194 contains operations which allow a system 10 user to set all system 10 counters to zero.

There are three very general steps involved in the use of Character Recognition system 10. One first must obtain and appropriately highlight an image; teach the desired characters; and analyze images containing these characters in system operation. To see how these general steps are used in conjunction with tree structure 60 we must traverse displays and menus generally presented to a user of system 10 upon terminal 44.

Initially, Main Menu category 62; Part selection category 64; Analyze category 68; Local Lock category 74; and Quit category 78 are presented to a user as shown in FIG. 4. One may select categories 64, 68, 74 and 78 by engaging keys "P", "A", "L" or "Q" of keyboard 45 respectively. Normally, category 74 is selected. After this selection, terminal 44 displays FIG. 5. FIG. 4 shows a display of category 74 and category 76. A user simply engages keyboard 45 to enter a correct password. System 10 normally stores a plurality of valid passwords and will check these passwords relative to the entered one. If the entered password is contained within system 10, then a display, as shown in FIG. 6, appears on terminal 44.

As shown in FIG. 6, categories 62, 64, 68, 74, 78 and 80 are displayed and may be entered by engaging the "P", "A", "L", "Q" and "S" keys of keyboard 45 respectively. In order to teach a character (i.e., to enter category 118), one must engage the "S" key as shown in FIG. 2. After the "S" key is engaged, the display will now change according to FIG. 7.

As shown in FIG. 7, Categories 82, 88, 90, 118, 170, 180, 188 and 184 are presented. To enter these categories a user of system 10 simply engages the "F", "O", "V", "T", "C", "S", "H" or "X" keys, respectively, of keyboard 45. To go back to the previous display, as shown in FIG. 7, the user engages the escape operation by engaging the "Escape" key of keyboard 45. To teach a character, the user engages the "F" key. Results of this engagement are shown in FIG. 8.

As shown in FIG. 8, category 84 is displayed. In the preferred embodiment of this invention approximately eight field may be defined upon image 41. These field act as windows in defining an area of image 41 for particular character analysis. Also, in the preferred embodiment of this invention, each field may have a font associated with it which is one of possible font choices. The font refers to the font of the particular characters contained within the previously defined field. To associate a font with a field, as shown in FIG. 8, a system 10 user moves a cursor (not shown) up and down column 200 by means of the " ↑ " and " ↓ " arrow keys of keyboard 45. When the cursor is placed upon the desired associated field, contained within column 202, a user selects font types by engaging the "→" arrow key (causing font number 204 contained within column 200 to increase) or the "←" arrow key (causing font number 204 degradation) of keyboard 45. To return to the display of FIG. 7, the user engages the "Escape" key of keyboard 45. After the field of interest has an associated font type (designated by font number 204) a user engages the "Enter" key of keyboard 45 in order to save this information. This process may be sequentially repeated for all eight fields contained within column 202.

After an "Enter" key is engaged for a given field, the display associated with FIG. 9 appears upon terminal 44. FIG. 9 contains a display of category 86. At this point within the teaching processes, a box (not shown) will appear upon monitor 26. This box represents the previously defined field and font. This box should be placed upon the set of characters to be taught which is contained within image 41. In the preferred embodiment of this invention, a single character is taught in an instant of time.

The box may be moved upon monitor 26 and may be shrunk or expanded in width. These operations first require the "Enter" key of keyboard 45 to be engaged. To move the box, a System user engages the "=", "←", " ↑ " or " ↓ " keys of keyboard 45 which will cause the box to move left, right, up or down, respectively. When the "Enter" key is engaged to size the box, these same arrow keys cause the box to expand or grow in defined directions upon monitor 26. A shrinking or growing of the box is always done, in the preferred embodiment, by causing the left bottom edge of the box to be a constant and hence never shrink or grow itself.

Increment row 206 describes the number of pixels associated with a single engagement of the previously described arrow keys. Engagement of the "HOME" key of keyboard 45 causes this number of change to either one or ten. Status row 208 details the current operational status (i.e., move or size box). After the box is duly placed upon the character to be taught, the "Escape" key is engaged bringing us back to the previous display of category 84 as shown in FIG. 10. If there are no additional fields to define, the "Escape" key should be engaged again bringing the user back to a display of category 80 shown in FIG. 11. We have traversed a portion of the tree contained upon category 80 as shown in FIG. 2.

The "O" key of keyboard 45 is engaged in order to enter category 88 and the category is displayed as shown in FIG. 12. To activate a field, a user of system 10 moves a cursor (not shown) within column 210 by means of the " ↑ " and " ↓ " arrow keys of keyboard 45. The Field associated with an entry 212, contained in column 214 is caused to be activated by modifying the entry 212 to a logical 1 by use of the "→" key of keyboard 45. The use of the "←" key similarly deactivates fields in column 214. Engagement of the "Escape" key of keyboard 45 will enable structure 60 to be traversed so that category 80 will be entered and displayed as shown in FIG. 13.

The "V" key of keyboard 45 is now engaged so as to enter Vision category 90 as displayed in FIG. 14. FIG. 14 shows Categories 92, 94 and 96 displayed. The use of Categories 92–96 have already been explained. Categories 92–96 may be selected by engaging the "A", "V", and "M" keys of keyboard 45 respectively. The results of these operations will be to obtain a bit plane representation of image 41 and a highlighting of the characters to be taught. The vision set of operations necessary for this purpose are stored within memory 20 at a location which is known to system 10 by means of a data pointer which is made to be returned to system 10 upon completion of the vision operations associated with Categories 92–96. The results of these operations upon image 41 are shown upon monitor 26 (not shown in figures). After the operations have been completed, a user of system 10 should engage the "Escape" key of keyboard 45 in order to return to a display of the category 80 structure as shown in FIG. 15. The "T" key of keyboard 45 should then be engaged in order to teach a character. The results of this engagement are shown in the display of FIG. 16.

FIG. 16 shows a display of Categories 120–134 which may be selected by engagement of the "A", "T", "N", "M", "O", "E", "F" or "L" keys, respectively, of keyboard 45. Column 216 contains a listing of associated fonts 220 and column 218 will contain names of characters which have already been taught and placed within these Fonts 220. After category 120 has been selected, the display of terminal 44 is shown in FIG. 17. Categories 136, 138, 140 and 142 are displayed and may be selected by the engagement of the "F1", "F2", "F3" or "F4" keys of keyboard 45, respectively. Category 140 must always be selected before category 136 in the preferred embodiment of this invention because test points may not be displayed (i.e., category 136) before they are created (i.e., category 140). A user of system 10 should normally engage the "F3" key at this point. Results of this engagement are shown in FIG. 18.

A box is placed upon monitor 26. The box should be moved and sized, as before, over a character to be taught by use of the "←", "→", "↑" and "↓" keys of keyboard 45. Row 220 again shows the status of the operation and row 222 show the pixel increment associated with the engagement of the aforementioned keys. Use of the "Enter" key of keyboard 45 again allows a system 10 user to either size or move the box and the "HOME" key allows the increment to be either one or ten pixels. After this box has been placed upon the character, the "Escape" key should be engaged so as to return to display of category 120 as shown in FIG. 19. Category 142 should then be selected so as to show and detail parameters associated with the previously used category 140. Results of this selection are shown in FIG. 20.

FIG. 20 displays, for selection, categories 144, 146, 148, 150, 152 and 154. To select these categories 144–154 a cursor (not shown) is made to traverse column 224 by use of the "↑" and "↓" keys of keyboard 45. Each entry 226 in column 224 corresponds to a category 144–154 in column 228. To increment the entry 226 (or simply activate or deactivate) use is made of the "→" (increment or change activation) and "←" (decrement or change activation) keys of keyboard 45. Row 230 illustrates the current increment associated with an engagement of the aforementioned "→" or "←" keys and the "Home" key of keyboard 45 may change this increment to either one or ten.

While Categories 144–154 have already been explained in detail, it should again be stated that the results of a selection of these categories is to make the aforementioned box into a grid having a plurality of horizontal components and vertical components of a given "x" and "y" spacing, respectively. This grid logically intersects the character in order to define, in an automatic fashion, test sample points used for later character recognition. The "Escape" key of keyboard 45 is engaged causing a display of category 120 as shown in FIG. 21. If category 36 is now selected, it will cause a correlation to occur based upon the previously defined test sample points. This correlation will create a generally bluish lines (not shown) emanating from the left edge of a character having those test points, to the bottom of monitor 26. Category 136 is used to view the results of character recognition based upon the previously defined test points. If category 138 is selected, display upon terminal 44 will now be substantially similar to FIG. 22

FIG. 22 contains row 232 which will display a percentage of points to be identified in a given character. Such a percentage may be specified by a system 10 user through keyboard 45. The "Escape" key of keyboard 45 should be engaged after the percent is specified in order to return to a display of category 118 as shown in FIG. 23. It should be noted that at this point a complete character has been taught in an automatic fashion.

Upon viewing FIG. 23, a system 10 user may select category 122 allowing for the manual teaching of a character. After this selection, display terminal 44 contains FIG. 24 which contains categories 158–168.

Monitor 26 now may be seen (not shown) to contain a cursor whose position may be generally controlled by use of the "↑", "↓", "→" and "←" arrow keys of keyboard 45. The cursor is placed at a position, within a character to be taught, such that this position defines a test or sample point. By engaging the 'Enter" key of keyboard 44, this cursor's position may be stored as a sample point or may delete a previously defined sample point. Row 234 defines the current pixel increment associated with these aforementioned arrow keys. "Home" key of keyboard 45 may be engaged thereby causing the increment to be either one or ten pixels. Row 236 defines a system 10 user specified percentage of test points needed to identify the character. Categories 160–166 have already been described. A character has now been manually taught. After engaging the "Escape" key terminal 44 will display category 118 as shown in FIG. 25. After teaching a character, a system 10 user must name it by selecting category 124 which will cause FIG. 26 to be displayed.

Row 238 now appears to display the single symbol given to the taught character by a system 10 user through keyboard 45. After a symbol has been entered, FIG. 27 is caused to be displayed which contains row 240 displaying a system 10 user specified font number type associated with the previously named character. After the font has been specified and entered by use of keyboard 45 display on terminal 44 is made to be similar to FIG. 28.

Column 240, containing a listing of font types, now has the named character (i.e. "N") displayed in the appropriate row 242 in columns 244 corresponding to font O. To modify the character by means of category 126 the user would engage the "M" key of keyboard 45 thereby creating a display upon terminal 44 similar to FIG. 29. The character name, to be modified, and associated font (as shown in FIG. 30) are specified and displayed. When the character and font have been specified, display terminal 44 is made to produce a display similar to FIG. 31. At this juncture, a plurality of points appears on an arbitrary location on monitor 26 (not shown). These points are moved to be within the desired character by means of the " ↑ ", " ↓ ", "→" and "←" arrow keys of keyboard 45 as before. When the points are upon the character, the "Escape" key of keyboard 45 should be engaged thereby producing a display similar to that of FIG. 24 (i.e., displaying category 122). Points may be created or deleted as previously specified in the discussion of FIG. 24. After the modified points have been created, the character should be renamed using the earlier specified procedure. The earlier name may be used again in this process of renaming. To leave category 126, a system 10 user should engage the "Escape" key of keyboard 45 which produces a display of category 118 as shown generally in FIG. 32.

FIG. 32 shows three 246-250 characters associated with two fonts 252, 254 which we will assume have been created. To select category 128, the 'D' key of keyboard 45 is engaged producing a display similar to FIG. 33. The character name must be entered by use of keyboard 45 and is displayed along row 256. FIG. 34 is then displayed and the associated font number must be entered, by use of keyboard 245, and is displayed along row 258. FIG. 35 shows the result of the aforementioned Delete operation. That is, character 250 has been erased from system 10.

Display associated with FIG. 35 is produced and a system 10 user desiring to delete characters 246, 248 within Font 252 would select category 130. As a result of this selection, a display similar to FIG. 36 is created. FIG. 36 contains row 260 for displaying a font number whose characters 246, 248 are to be deleted. In this case Font 252 corresponds to the font O of system 10. Font 252 is specified by use of keyboard 45. After Font 252 is specified, a display similar to FIG. 37 is created showing the deletion of characters 246, 248 from system 10. Categories 132, 134 have been described earlier in detail. A fiducial character may be taught in a manner similar to the techniques associated with previously defined manual and automatic teaching of system 10. For the recognition of a fiducial character, a field of system 10 has been defined to be the entire pixel field associated with monitor 26 and such field is defined only for a fiducial character. Light teaching may be done manually utilizing previously described manual teaching techniques. The "Escape" key should now be engaged, while in FIG. 37, in order to view category 80 as shown in FIG. 38.

Category 170 should be selected by engaging the "c" key of keyboard 45 and a resultant display, shown in FIG. 39, arises. FIG. 39 contains Categories 172-178 which may be selected by engagement of the "P", "A", "D", and "V" keys of keyboard 45, respectively. Upon selection of category 172, a display similar to FIG. 40 arises.

FIG. 40 contains display section 262 which allows a precedence string to be associated with one of the fonts of system 10. Rows 264-268 correspond to default string which may be selected by a system 10 user upon engagement of the "1", "A", or "X" keys of keyboard 45, respectively. All other strings must be created, a single symbol at a time, by using keyboard 45. Row 270 displays the selected string number 272 that a string is to be entered into.

Upon selecting the string number 272, row 270 displays the exact string desired, as shown in FIG. 41. The selected string will be stored by system 10 for later analysis. The "Escape" key of keyboard 45 should now be engaged to return to a display of category 170 as shown in FIG. 42. Category 178 should be selected resulting in a display similar to FIG. 43.

FIG. 43 contains columns 274 and 276. Entries 278 within correspond to string contained in Section 262 of FIG. 40. Entries 280 in Column 276 correspond to the activation of associated entry 278. To change activation status of entry 280, a cursor (not shown) is made to traverse column 276 by the use of " ↑ " and " ↓ " arrow keys of keyboard 45. When the cursor is placed upon the desired entry 280, the "→" arrow key of keyboard 45 may be engaged to activate entry 280 and therefore associated entry 278. Engagement of the "←" arrow key of keyboard 45 will similarly cause disengagement. Use of the "Escape" key of keyboard 45 causes a display of category 170 as shown in FIG. 42. Selection of category 174 will result in a display of FIG. 44.

FIG. 44 is seen to contain column 282 corresponding to fonts of system 10. Each unique font represents an entry 284 in column 282. FIG. 4 also contains columns 286 containing entry 288. Entry 288 specifies the average distance associated with characters in font entry 284.

Entry 288 may be modified by the movement of a cursor (not shown) within column 286. The cursor is controlled by arrow keys of keyboard 45 in a manner previously specified for FIG. 43. The entry 288 may be increased in a manner previously specified for FIG. 43 by the use of the "→" and "←" arrow keys of keyboard 45.

Additionally, system 10 will automatically calculate the value of entry 288. This automatic technique is accomplished by providing a cross hair (not shown) upon monitor 26. System 10 user places this cross hair, by use of the " ↑ ", " ↓ ", "→", and "←" arrow keys of keyboard 45 to the left-most edge of one of the characters within a given font. The user engages the "Enter" key of keyboard 45 and system 10 stores this position. The user the move the cross hair to the left-most edge of the next character and again engages the "Enter" key. System 10 again stores this location and then computes average distance by subtracting these stored locations. Upon twice engaging the "Escape" key of keyboard 45, a system 10 user traverses structure 60 such that a display is created similar to FIG. 45. A selection of category 68 is done resulting in a display of FIG. 46.

FIG. 46 displays Categories 192, 194 which may be selected by engagement of the "F1""F2" keys of keyboard 45, respectively. After the "F1" key is engaged, FIG. 47 is displayed.

FIG. 47 has a plurality of options 290-300 contained within category 196. Options 290-300 may be activated by means of a cursor (not shown) traversing column 302. Option 290 allows for the display of analysis results to terminal 44. Option 292 allows for the communication of results to a host computer (not shown). Options 294, 296 allow for the total number of character, identification readings to be displayed once upon the engagement of a key of keyboard 45 or continuously respectively. Option 298 inhibits color on monitor 26. Option 300 allows for the communication with external controller devices.

Engagement of the "Escape" key of keyboard 45 creates a display similar to FIG. 46. After selection of category 194, a display similar to FIG. 48 is created which shows that all counters 304 associated with a specific font 252 have been zeroed out. These counters 304 are used to total the number of images read and the number of successful character identifications made in these images, for every unique font 252 of system 10. Upon engagement of the "Escape" key of keyboard 45 twice, a display similar to FIG. 6 created. Category 64 is selected which causes a display similar to FIG. 49 to be created.

FIG. 49 displays Categories 66, 67, 70 and 72 which may be selected by engaging the "R", "S", "D" or "X" keys of keyboard 45. If a system 10 user engages the "S" key, a display is created similar to FIG. 50.

FIG. 50 contains row 306 which displays the user input file name created by use of keyboard 45. This file will contain all operations necessary for the recognition of a given character. After a file name has been entered (i.e., "test 1"), category 70 may be selected to view the file contents of system 10. This causes a display similar to FIG. 51 to appear upon terminal 44. Files 308, 310 are accordingly displayed. Any key of keyboard 45 may be engaged to continue.

If one wished to retrieve a file, category 66 would be selected causing FIG. 52 to be displayed containing row 312 which displays the name of the file to be retrieved (i.e., test 2). FIG. 53 illustrates the use of row 314 of system 10 to inform a user of the file retrieval process taking place.

If a user of system 10 now engages the "Escape" key of keyboard 45, a display similar to FIG. 54 will be created. Category 180 is now to be selected and explained. This selection creates a display similar to FIG. 55.

FIG. 55 is seen to contain category 182 which itself contains operational options 316-324. Options 316-324 are arranged within column 326. Activation specifications associated with options 316-324 are contained within column 328. A cursor (not shown) is made to traverse column 328 thereby effecting an activation specification.

Option 318 allows a correlation to be achieved with a user-specified percentage of test points. Option 316 allows for system 10 to ignore the Average Distance and Precedence Tables. Option 320 allows for system 10 to verify the presence of a defined string even if the string is contained within a larger string. Option 322 allows system 10 to locate a fiducial. Optional 324 specifies the manner in which the characters are to be highlighted (i.e., automatically, manually, or by use of VisionMaker).

Engaging the "Escape" key of keyboard 45 allows for the creation of a display similar to FIG. 54. Selecting category 188 thus produces a display similar to FIG. 56. FIG. 56 displays category 190 which contains operational options 330-340 which are contained in column 342. Entries 346 correspond to options 330-340 and are contained with column 344. Entries 346 may be modified by previously specified cursor control techniques.

Option 330 relates to the number of cameras 14 used by system 10. Option 332 relates to the field used by camera 14. Option 334 relates to a time, in milliseconds, which will define be a delay associated with capturing image 41 after a command has been received to do so. Option 336 relates to the use of a strobe, electronic shutter, or a regular RS-170 camera. Optional 338 relates to a delay, of up to 32 image acquisition times in the preferred embodiment, before an output from system 10 is created. Option 340 relates to the number of processors used by an arbitrarily selected computerized vision system 12. If the "Escape" key of keyboard 45 is engaged, a display similar to FIG. 57 is created.

FIG. 57 displays category 186 which contains operational options 350-358 which are contained within column 360 and have associated activation specifications 362 contained within column 364. Specifications 362 are modified by previously defined cursor control.

Option 350 relate to the control from keyboard 45 to signal initialization of the character recognition process. Options 352, 354 relate to process initialization started by the rising or falling edge of a pulse respectively. Option 356 relates to host computer (not shown) process initialization. Option 358 relates to continuous character recognition, without the need for any external initialization signal. Thusly, the entire structure 60 of FIG. 2 has now been fully explained. It may now be well to generally overview the prior sequence of steps associated with system 10.

Generally, the Character Recognition system 10 of this invention may be though of as achieving its objects in a sequence of generally global steps. That is, initially a Gray Scale image, containing a character to be taught, is acquired. The Gray Scale image is modified so that it becomes a bit plane representation in which the characters to be taught are highlighted. Fields are defined, for analysis purposes, over the characters to be taught and later read. The characters are sequentially taught to system 10 either manually or automatically and known vector correlation techniques are used to identify resultant characters. In the preferred embodiment, system 10 may have up to eight defined fields which themselves may have up to eight unique fonts associated therewith.

Figure 58:
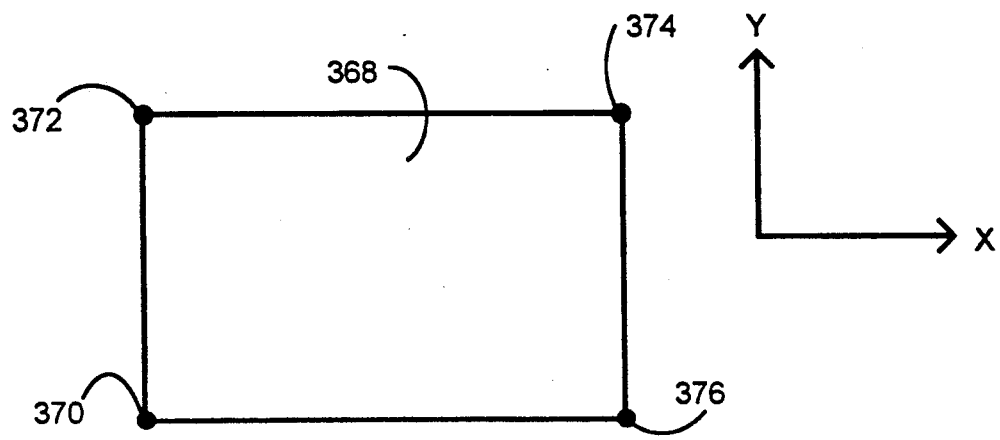
FIG. 58 is a general illustration of a field location of the preferred embodiment of this invention.

A field 368 upon image 41, may be described as shown in FIG. 58 as having a sequence of points 370-376 defined in terms of a general Cartesian Coordinate system. Each field 368 may have its location stored simply by utilizing the information contained within points 370 and 374. That is, since field 368 is generally rectangular, the knowledge of location associated with points 370, 374 allow field 368 to be reproduced at a later time by means of simple geometric live projections. Each field is also associated with a given font and may be selectively activated by a system 10 user. This location, font and activation information is all stored within memory 20 for every field of system 10.

Characters may be taught to system 10 in the manner previously specified. Each character has a data structure associated with it which is formed during the teaching process and allows for later identification by system 10.

The structure contains the following:

(a) an array of up to forty correlation shift vectors created by the aforementioned sample points of a given character;

(b) a total number of shifts;

(c) the name given to the character;

(d) height (in pixels) of the character; and (e) percentage of sample points needed to recognize the character by the correlation technique.

Each character, within a specified font, has such an associated structure created for it. It is by this structure that system 10 recognizes a taught character.

In the preferred embodiment, system 10 will normally analyze field 252 and read the associated font from the field data structure. System 10 will look at the data structure of the first character taught for that font and try to find it. If the character is found, system 10 will remember the left-most position of the character within image 41. Each taught character within that font 252 will be analyzed in a similar manner until all characters within a font are exhausted. Each field that is activated will be analyze din a similar manner. When every activated field has been analyzed, the aforementioned character locations are stored, the average distance and precedence tables may be consulted, and the subsequent found characters may be displayed or other aforementioned options accomplished (i.e., string verification).

An additional feature of the preferred embodiment of this invention deals with vector correlation methodologies used particularly within computerized vision system.

For example, referring to FIGS. 62A-D, one method in accordance with the present invention for recognizing a character wherein the character contains a plurality of pixels which may be activated, and wherein the character is of a width equal to a number of pixels is the following: obtaining a bit plane image wherein the image includes the character; creating a field upon the image wherein the field overlays the character; activating the pixels contained within the character; reducing the width of the character to approximately one pixel; creating a grid over the reduced character so that the grid intersects the character at a plurality of points wherein the points are at a plurality of locations upon the character; displaying the character and plurality of points; and storing the points and their locations whereby the stored points may be used to recognize the character. Where the sample points have widths the method may further comprise reducing the widths of the sample points to a width of approximately one pixel.

In addition the character may be given an arbitrary name and the method would further comprise the step of storing this arbitrary name. Also, the method may further comprise providing a vector correlation means for causing the character to be recognized by use of the stored points and locations. In addition the pluralities of characters may be uniquely associated with the plurality of fields and the method further comprise the steps of providing a unique bit plane for every one of the fields wherein the bit plane has a plurality of rows; associating each of the rows with a unique character associated with the field; and placing the correlation point data of the unique character on the associated row.

Figure 59:
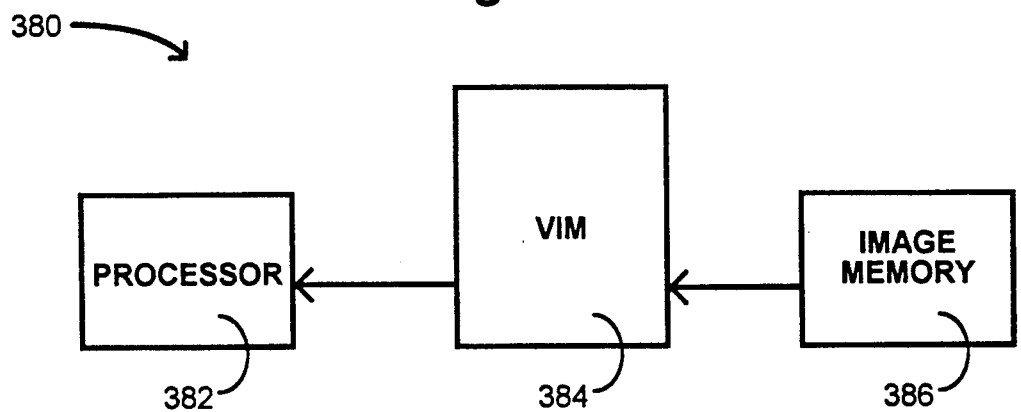
FIG. 59 is a general illustration of an image processing sequence associated with a computerized vision system used in conjunction with the preferred embodiment of this invention.

FIG. 59 illustrates the normal sequence of operations 380 associated with placing an image 41 within an image processor 382 contained within computerized vision system 12. Initially, image 41 is played within image memory 386. Image memory 386 is normally not accessible by system 10 or any other entity. Vision input memory (VIM) 384 is a read-only type memory and may be accessed.

During vector correlation, correlated image 41 must be sent to VIM 384. An object of this data transfer correlation technique of this invention is to insure that a minimum number of transfers to VIM 384 is needed so that image processing may be done within a minimal amount of time.

In character recognition, a correlation point is normally found at some place within image 41. For example, this correlation point is operated upon by a Vision-Maker function Col-OR so that the X-position of this point may be found by simply scanning the bottom of the image.

Figure 60:
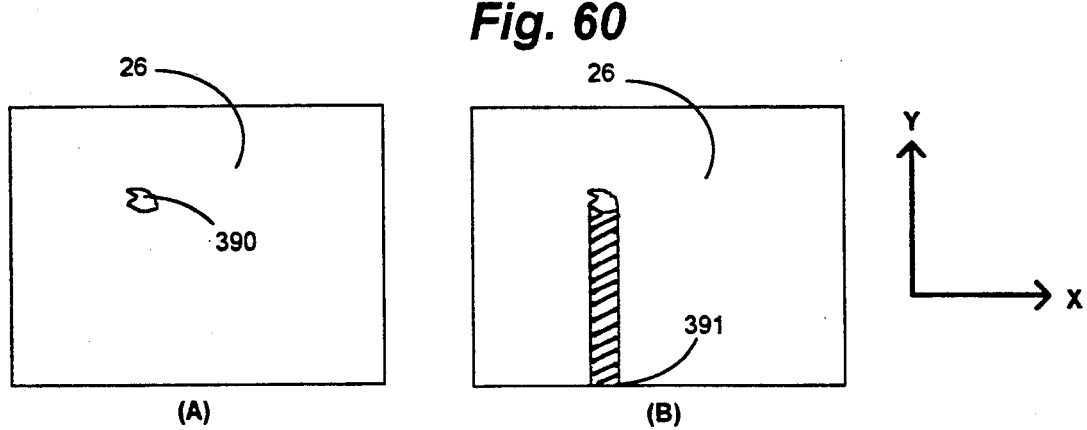
FIG. 60 is a general illustration of correlation techniques associated with the preferred embodiment of this invention.

FIG. 60(a) shows a correlation point 390 upon monitor 26. FIG. 60(b) shows the results of the Col-OR operation upon point 390. Since each correlation produces a given X-position 391 per correlation point, this X-position 391 representing the totality of correlation points associated with system 10 may be structured before they are sent to VIm 384, thusly reducing the number of pixels needed to be scanned by VIM 384 and requiring only a single transfer from Image Memory 386.

Figure 61:
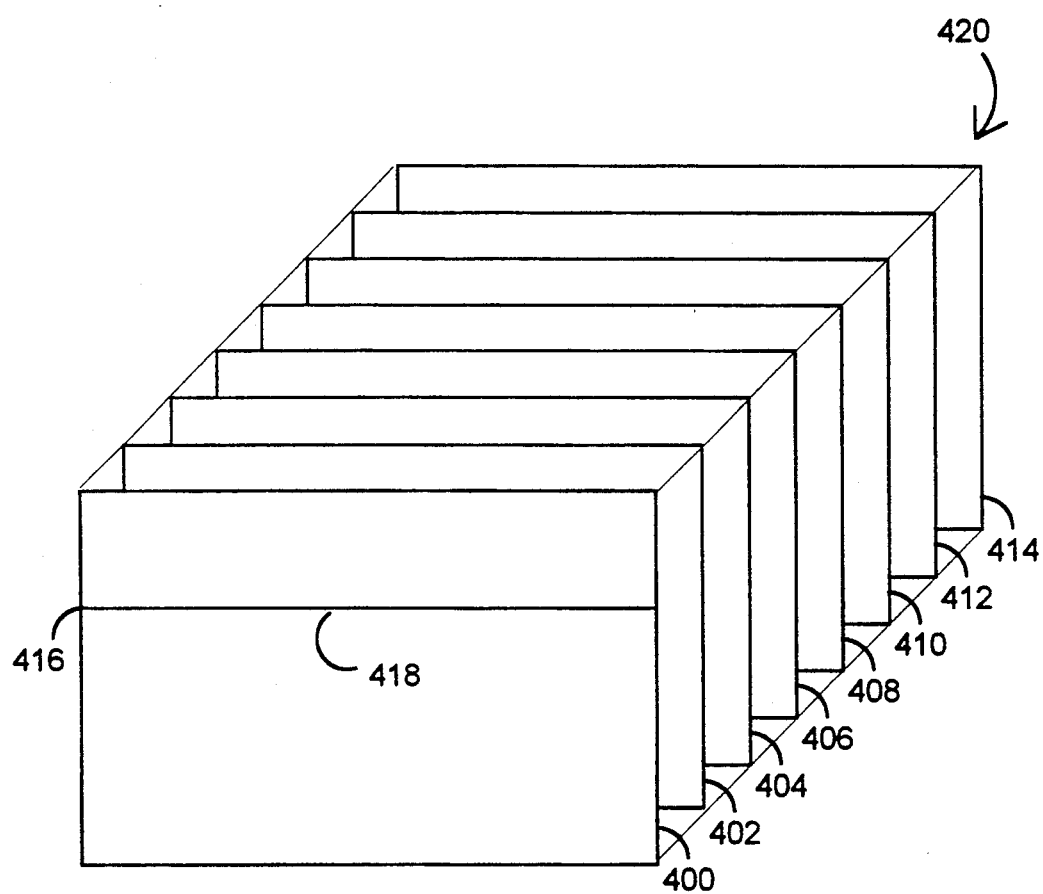
FIG. 61 is a general illustration of a data packaging technique associated with the preferred embodiment of this invention.
Figure 62:
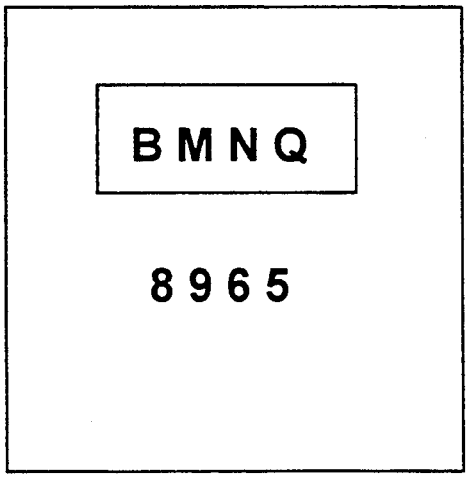
FIG. 62A-D is a general illustration of the image processing technique in accordance with the present invention.
Figure 62:
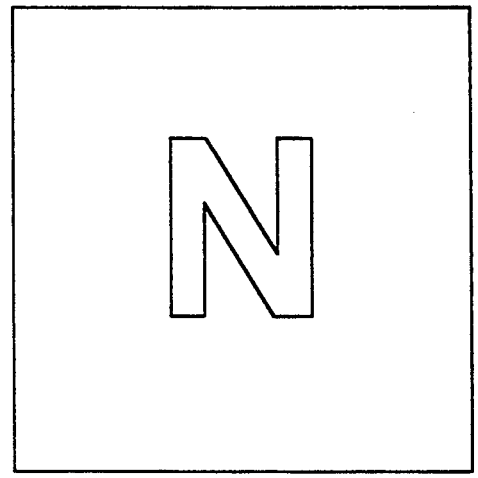
Figure 62:
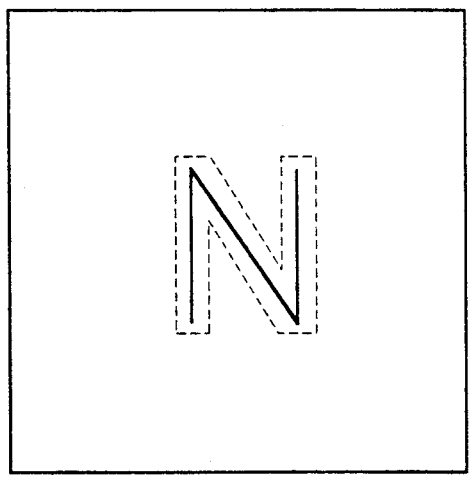
Figure 62:
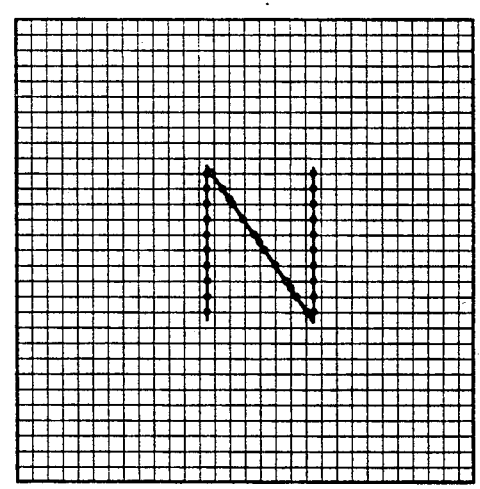

FIG. 61 details the data packing structure associated with the preferred embodiment of this invention. Since the VIM 384 may contain eight bit planes 400-414, one could visualize VIM 384 as containing a single 3-dimensional plane 400 which is eight bits deep. Each field 416 of system 10 corresponds to a single bit plane 400-414 within this structure. Each row 418 of planes 400-414 corresponds to a given character within field 416. The X position data associated with the character is contained within row 418. Thusly, all correlation data associated with all fields 416 of system 10 is pre-packaged in this manner before it is transmitted to VIM 384.

This packing is accomplished by sequentially creating a correlation of substantially every character of a given font and packing the correlation data, upon separate character rows 418 thereby forming a single plane. Each field is affected in this manner until eight planes 400-414 are created and overlaid upon each other thus forming structure 420.

Although a single embodiment of this invention has been illustrated in the accompanying drawings and described in the foregoing details of the description, it will be understood that the invention is not limited to the embodiment disclosed, but its capable of numerous rearrangements, modifications, and substitutions without departing from the scope of the subjoined claims within or within the scope of the aforementioned invention.

We claim:

1. A method for recognizing a graphical symbol such as a character comprising:
   (a) obtaining a digitized image which includes as a portion thereof said graphical symbol which is a character of an arbitrary height from a predetermined set of characters comprising a predetermined font;
   (b) sampling at least that portion of the digitized image which contains said graphical symbol thereby creating a plurality of sample points at locations within the digitized image representing said graphical symbol;
   (c) displaying said plurality of sample points;
   (d) storing said plurality of sample points and their said locations within said digitized image, whereby said stored points and said locations are used to recognize said graphical symbol; and
   (e) performing a vector correlation on said stored points and locations which compares said points with a set of known points from a known graphical symbol comprising a known character from said font to determine if said graphical symbol matches said known character; and
   (f) using said vector correlation to determine a single correlation point for each graphical symbol.

2. A method for recognizing a character comprising:
   (a) obtaining a digitized image using a camera which includes as a portion thereof said character;
   (b) sampling at least that portion of the digitized image which contains said character thereby creating a plurality of sample points at locations within the digitized image representing said character;

(c) displaying said plurality of sample points;

(d) storing said plurality of sample points and their said locations within said digitized image, whereby said stored points and said locations are used to recognize said character; and (e) performing a vector correlation on said stored points and locations which compares said points with a set of known points from a known character to determine if said character matches said known character by use of only a specified percentage of a total number of said plurality of said stored points.

3. The method of claim 2 wherein computer means is provided for storing a plurality of passwords and whereom, said method further comprising:

providing computer means for storing said specified percentage.

4. A method for recognizing a graphical symbol such as a character containing a plurality of pixels which may be activated and wherein said character is of a width equal to a number of pixels, the method comprising:

(a) obtaining an image digitized into a bit plane representation which includes as a portion thereof said graphical symbol;

(b) sampling at least that portion of the digitized image which contains said character thereby creating a plurality of sample points at locations within the digitized image representing said graphical symbol;

(c) displaying said plurality of sample points;

(d) storing said plurality of sample points and their said locations within said digitized image, whereby said stored points and said locations are used to recognize said graphical symbol; and (e) performing a vector correlation on said stored points and locations which compares said points with a set of known points from a known graphical symbol to determine if said graphical symbol matches said known graphical symbol, and wherein said sampling step (b) includes:

(1) activating said pixels contained within said character which intersect with the grid;

(2) reducing said width of said character to approximately one pixel; and (3) positioning said grid over said reduced character; and (4) defining said sample points to be the intersection of said grid with said reduced character.

5. The method of claim 4 wherein said sample points and wherein said method further comprises:

reducing said sample points to a width of approximately one pixel.

6. A method for recognizing a character wherein said character contains a plurality of pixels which are activated and wherein said character is of a width equal to a number of pixels, said method comprising:

(a) obtaining a bit plane image wherein said image includes said character upon a background;

(b) creating a field defining an area of said image upon said image wherein said field overlays said character and at least a portion of said background;

(c) activating pixels contained within said character to be readily distinguishable from pixels representing said background;

(d) reducing said width of said character to approximately one pixel in both horizontal and vertical directions;

(e) creating a grid over said reduced character such that said grid intersects said character at a plurality of points wherein said points are at a plurality of locations upon said character;

(f) displaying said character and plurality of points;

(g) storing said points and their said locations; and (h) recognizing said character by means of said stored points and locations using vector correlation where only a specified percentage of a total number of said stored points need be matched with stored points and locations representing said character in prestored form.

7. The method of claim 6 wherein said method further comprising:

providing computer means for storing said specified percentage.

* * * * *